US012585175B2

(12) United States Patent　(10) Patent No.:　US 12,585,175 B2
Zhou et al.　(45) Date of Patent:　Mar. 24, 2026

(54) CAMERA BASE PLATE

(71) Applicant: SHENZHEN LEQI INNOVATION CO., LTD., Shenzhen (CN)

(72) Inventors: Feng Zhou, Shenzhen (CN); Liuyin Wang, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 88 days.

(21) Appl. No.: 18/512,051

(22) Filed: Nov. 17, 2023

(65) Prior Publication Data

US 2024/0085768 A1　Mar. 14, 2024

Related U.S. Application Data

(63) Continuation of application No. PCT/CN2022/115174, filed on Aug. 26, 2022.

(30) Foreign Application Priority Data

Sep. 6, 2021　(CN) ......................... 202122142473.3

(51) Int. Cl.
G03B 17/56　(2021.01)

(52) U.S. Cl.
CPC ...... G03B 17/561 (2013.01); G03B 2217/002 (2013.01)

(58) Field of Classification Search
CPC ............................................. G03B 17/56–566
See application file for complete search history.

(56) References Cited

U.S. PATENT DOCUMENTS

| | | | |
|---|---|---|---|
| 7,493,674 B2 * | 2/2009 | Qin | ........................ G03B 17/04 |
| | | | 16/342 |
| 9,260,909 B2 | 2/2016 | Kaga | |
| 9,904,148 B1 * | 2/2018 | Druker | ................... F16M 13/04 |

(Continued)

FOREIGN PATENT DOCUMENTS

| | | |
|---|---|---|
| CN | 2463664 Y | 12/2001 |
| CN | 209883313 U | 1/2020 |
| CN | 210050551 U | 2/2020 |

(Continued)

OTHER PUBLICATIONS

English machine translation of CN 211826862 U (Year: 2025).*

(Continued)

*Primary Examiner* — Leon W Rhodes, Jr.

(57) ABSTRACT

The present disclosure discloses a camera base plate, which includes a plate body and a wrench. The plate body is defined with a battery avoiding port corresponding to an opening of a battery compartment of a camera. The battery avoiding port extends along a thickness direction of the plate body. The wrench is rotatably connected to the plate body through a damping assembly, and the wrench defines a part of a side wall of the battery avoiding port. In the present disclosure, the wrench can rotate to be gradually opened so as to define a gap in the battery avoiding port. After the plate at the opening of the camera's battery compartment is fully opened, a portion of the plate extends into the gap, thereby the plate can be opened completely, such that the battery can be removed or placed without detaching the camera from the camera base plate.

9 Claims, 4 Drawing Sheets

(56)        References Cited

U.S. PATENT DOCUMENTS 10,638,626  B1      4/2020  Park

FOREIGN PATENT DOCUMENTS

| CN | 211826862 | U | 10/2020 |
|----|-----------|---|---------|
| CN | 111983876 | A | 11/2020 |
| CN | 215449849 | U | 1/2022 |
| JP | 2010277104 | A | 12/2010 |

OTHER PUBLICATIONS

International Search Report issued in corresponding International application No. PCT/CN2022/115174, mailed Nov. 30, 2022.
Written Opinion of the International Search Authority in corresponding International application No. PCT/CN2022/115174, mailed Nov. 30, 2022.
European Search Report issued for European Application No. 22863328.5, mailed May 20, 2025 (11 pages).

* cited by examiner

CAMERA BASE PLATE

TECHNICAL FIELD

The present disclosure relates to the technical field of photographic device, and in particular to a camera base plate.

BACKGROUND

In order to achieve good shooting effect, more and more photography enthusiasts use cameras or monitors combined with camera accessories, such as camera base plate, shoulder mount, quick release plate, and adapter bracket. The camera is provided with a battery compartment which defines an opening, and the opening is covered by a plate. Due to the limited capacity of the camera battery, it often needs to replace the camera battery during the shooting process. However, it is inconvenient to remove the camera from the camera base plate, so there is a need of the camera accessory (such as the camera base plate or camera protective frame), that is allowable for the replacement of the camera battery without removing the camera from the camera accessory.

SUMMARY

The main purpose of the present disclosure is to provide a camera base plate, aiming to achieve removing a battery from a battery compartment of a camera without removing the camera from the camera base plate.

In order to achieve the above purpose, the present disclosure provides a camera base plate, and the camera base plate includes a plate body and a wrench. The plate body is defined with a battery avoiding port corresponding to an opening of a battery compartment of a camera. The battery avoiding port extends along a thickness direction of the plate body. The wrench is rotatably connected to the plate body through a damping assembly, and the wrench defines a part of a side wall of the battery avoiding port.

In some embodiments, the damping assembly includes a shaft, a first connecting member, a second connecting member, and at least one first washer. The first connecting member, the second connecting member, and the first washer are all located between two ends of the shaft. The first connecting member is rotatably sleeved on the shaft, and the second connecting member and the first washer are sleeved on the shaft. The at least one first washer is located between the first connecting member and the second connecting member. The first connecting member is fixedly connected to the wrench, and the second connecting member is fixedly connected to the plate body.

In some embodiments, the damping assembly further includes at least one elastic member sleeved on the shaft, and the elastic member is located on a side of the first connecting member away from the second connecting member, or on a side of the second connecting member away from the first connecting member.

In some embodiments, the elastic member is a spring or a bowl-shaped washer.

In some embodiments, the damping assembly further includes a second washer, and the second washer includes a first surface abutted the elastic member and a second surface abutted a side of the first connecting member. The second surface is provided with at least one limiting protrusion and the first connecting member is correspondingly defined with at least one slot. Or, the second surface is defined with at least one slot and the first connecting member is correspondingly provided with at least one limiting protrusion. Each limiting protrusion is capable of sliding into or out of a respective slot. Or, the second surface of the second washer abuts a side of the second connecting member. The second surface is provided with at least one limiting protrusion and the second connecting member is correspondingly defined with at least one slot. Or, the second surface is defined with at least one slot and the second connecting member is correspondingly provided with at least one limiting protrusion.

In some embodiments, at least one side of the limiting protrusion is provided with a first guiding slope, and at least one inner side wall of the slot is correspondingly provided with a second guiding slope. The first guiding slope abuts the second guiding slope.

In some embodiments, the limiting protrusion includes two opposite sides with each being provided with the first guiding slope. When the limiting protrusion is arranged on the second surface, a distance between the two first guiding slopes gradually decreases in a direction away from the second surface; when the limiting protrusion is arranged on the first connecting member or the second connecting member, the distance between the two first guiding slopes gradually increases in the direction away from the second surface. The slot includes two opposite sides with each being provided with the second guiding slopes, and a distance between the two second guiding slopes gradually increases in a direction away from a bottom wall of the slot.

In some embodiments, the wrench is defined with a accommodating groove to accommodate the first connecting member. And/or, a bottom wall of the accommodating groove is defined with a groove to accommodate an end of the shaft, the elastic member, and the second washer.

In some embodiments, both the second connecting member and the first washer are defined with a waist-shaped hole respectively. The shaft includes two opposite outer side walls with each defining an inclined surface, and the shaft passes through the waist-shaped holes of the second connecting member and the first washer.

In some embodiments, the camera base plate further includes a side plate and/or a top plate. And/or, the camera base plate further includes a locking member for connecting with the camera. And/or, a bottom surface of an end of the plate body away from the battery avoiding port is defined with a cold shoe groove. And/or, two sides of the plate body are provided with a slider respectively. And/or, the plate body is defined with a plurality of threaded holes.

In the present disclosure, the wrench of the camera base plate is rotatably connected to the plate body through the damping assembly. The wrench defines a part of the side wall of the battery avoiding port, or the wrench can be gradually opened during the wrench rotating so as to define a gap in the battery avoiding port. After the plate at the opening of the camera's battery compartment is fully opened, a portion of the plate extends into the gap, thereby the plate can be opened completely, such that the battery can be removed or placed in the camera without detaching the camera from the camera base plate, which is operating conveniently.

DETAILED DESCRIPTION OF THE EMBODIMENTS

Figure 1:
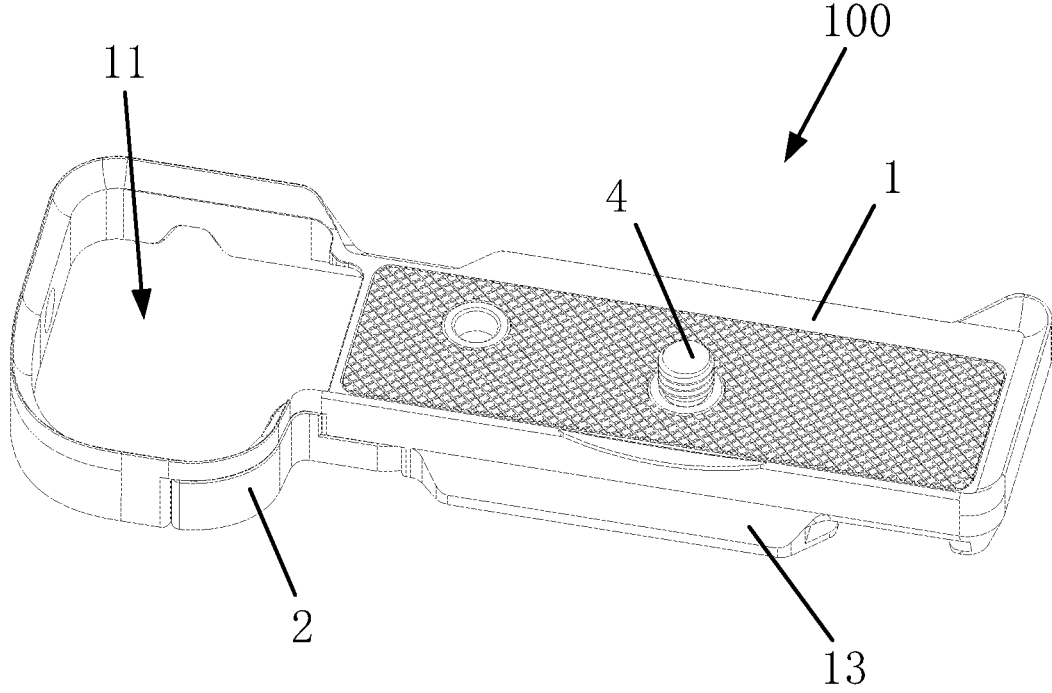
FIG. 1 is a perspective view of a camera base plate according to an embodiment of the present disclosure.

Detailed descriptions of the embodiments of the present disclosure are provided below, with examples of the embodiments shown in the accompanying drawings. Throughout the description, the same or similar reference numerals indicate the same or similar elements or elements having the same or similar functions. The embodiments below, as illustrated in the drawings, are exemplary and are intended to illustrate the present disclosure, but should not be construed as limiting the scope of the present application. Based on the embodiments of the present disclosure, all other embodiments that can be obtained by those skilled in the art without exercising creative labor are within the scope of protection of the present disclosure.

Figure 2:
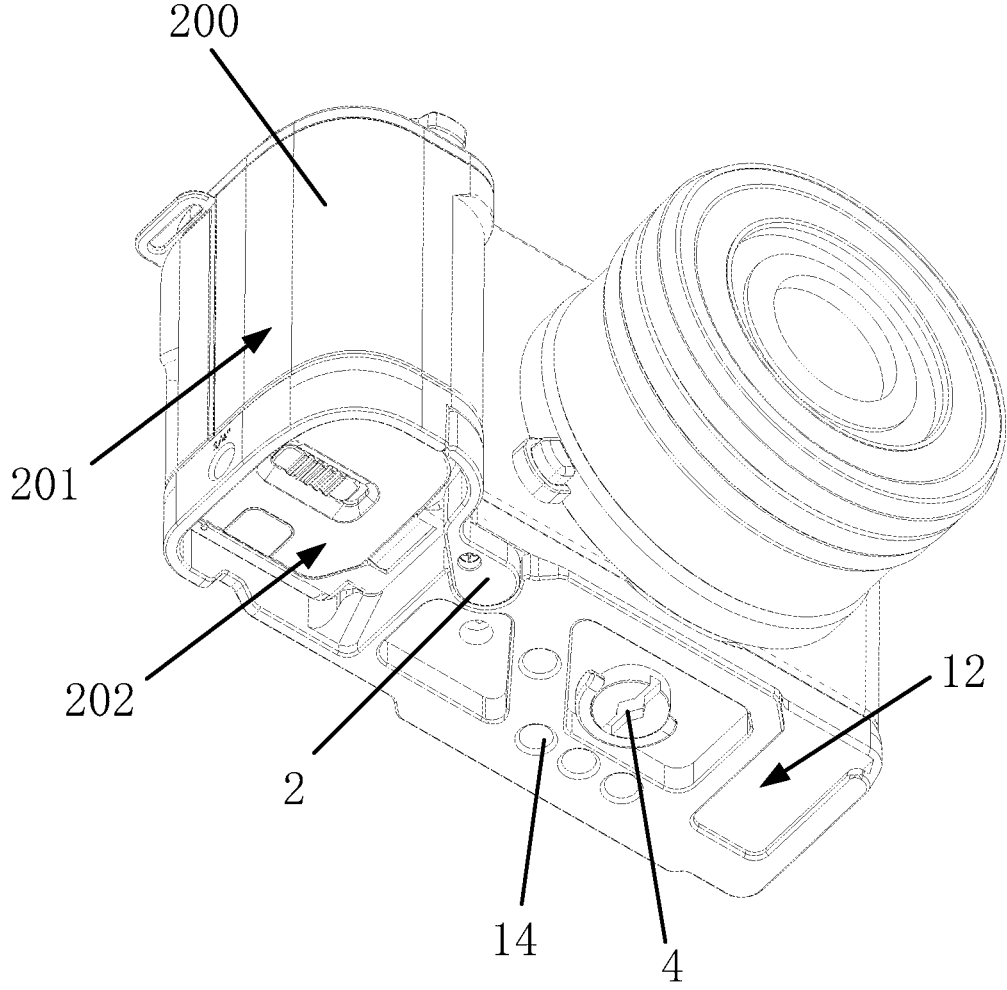
FIG. 2 is a perspective view of the camera base plate mounted with a camera according to an embodiment of the present disclosure.
Figure 3:
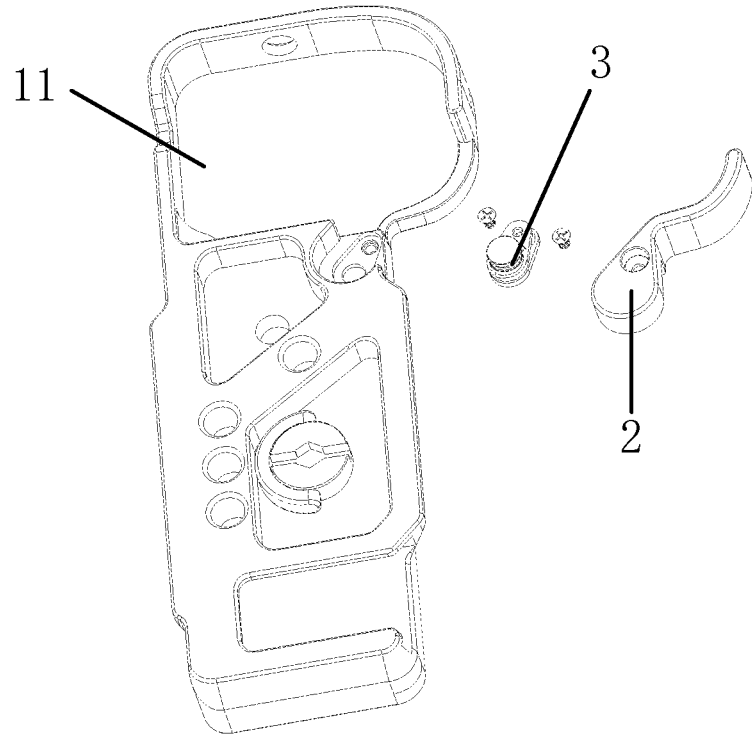
FIG. 3 is an exploded view of the camera base plate according to an embodiment of the present disclosure.

The present disclosure provides a camera base plate 100, referring to FIG. 1 to FIG. 3, the camera base plate 100 includes a plate body 1 and a wrench 2. The plate body 1 is defined with a battery avoiding port 11 corresponding to an opening 202 of a battery compartment 201 of a camera 200. The battery avoiding port 11 extends along a thickness direction of the plate body 1. The wrench 2 is rotatably connected to the plate body 1 through a damping assembly 3, and the wrench 2 defines a part of a side wall of the battery avoiding port 11.

In the present disclosure, the wrench 2 of the camera base plate 100 is rotatably connected to the plate body 1 through the damping assembly 3. The wrench 2 defines a part of the side wall of the battery avoiding port 11, or the wrench 2 can be gradually opened during the wrench 2 rotating so as to define a gap in the battery avoiding port 11. After a plate at the opening 202 of the camera's battery compartment 201 is fully opened, a portion of the plate extends into the gap, thereby the plate can be opened completely, such that the battery can be removed or placed in the camera 200 without detaching the camera 200 from the camera base plate 100, which is operating conveniently.

In this embodiment, the wrench 2 can be opened or closed smoothly by way of a damping effect of the damping assembly 3, which improves user experience. The camera base plate 100 covers a part of outer surface of the camera 200 to protect the camera 200. The camera base plate 100 is also configured to be connected with a photographic accessory to assist the camera 200 in shooting. The camera base plate 100 may be a square frame, an L-shaped plate, a C-shaped plate, or other shapes, which can partially or fully cover around the camera 200. The camera base plate 100 includes edges in the form of a plate or a strip. The camera base plate 100 may be made of metal material, and the camera base plate 100 may be an integration or an assembly. The battery avoiding port 11 matches the shape of the opening 202 of the battery compartment 201, and the wrench 2 supports the camera 200. The camera base plate 100 can be provided with two side plates and a top plate, or only a side plate. The battery avoiding port 11 is defined in the plate body 1 and can be set according to an orientation of the opening 202 of the battery compartment 201 of the camera 200. For example, the battery compartment 201 of the camera 200 is commonly arranged uprightly on a left side or a right side of the camera 200, the opening 202 is defined in a bottom of the battery compartment 201, and an outer wall of the battery compartment 201 can be held or gripped by users.

Figure 4:
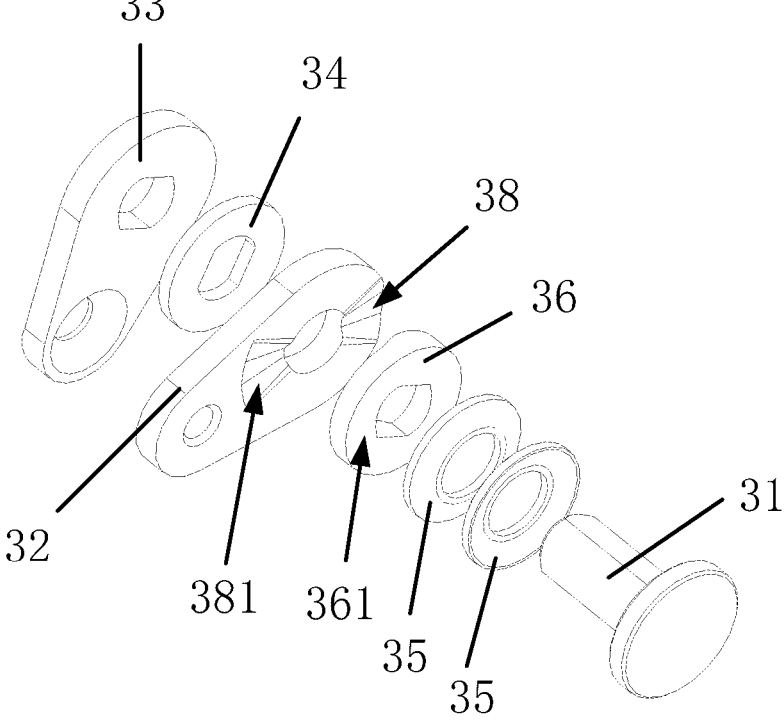
FIG. 4 is an exploded view of a damping assembly of the camera base plate according to an embodiment of the present disclosure.
Figure 5:
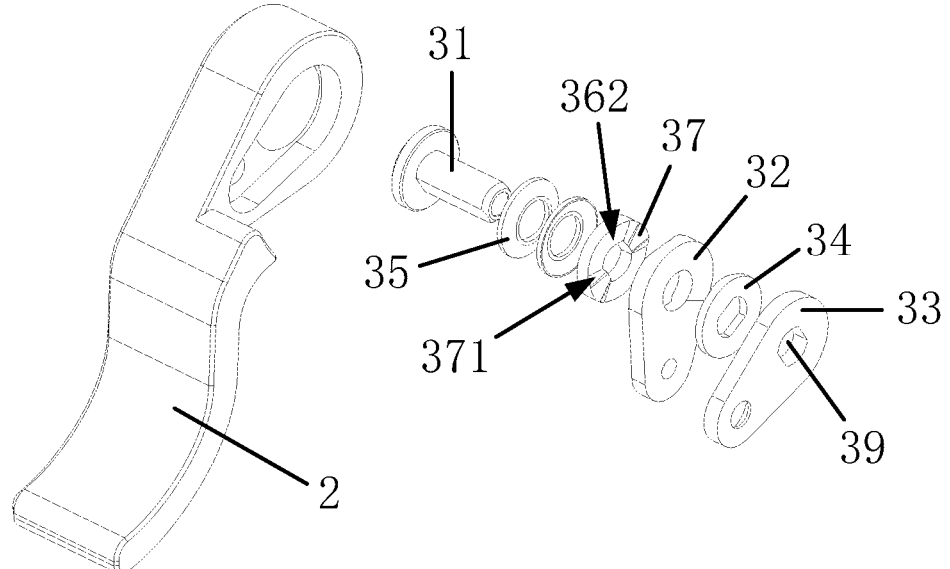
FIG. 5 is an exploded view of a wrench and the damping assembly of the camera base plate according to an embodiment of the present disclosure.
Figure 6:
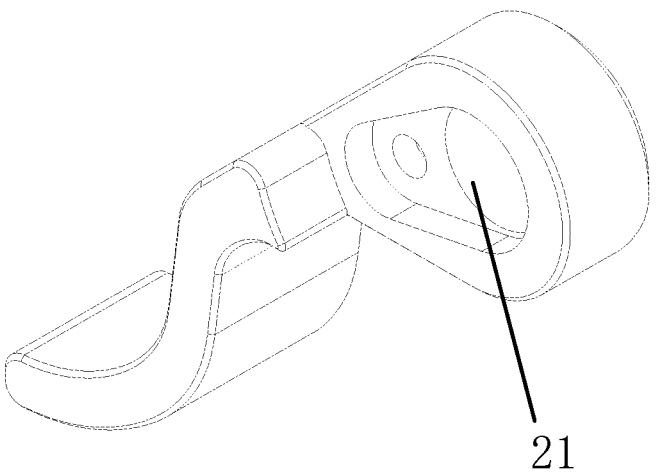
FIG. 6 is an exploded view of the wrench of the camera base plate according to an embodiment of the present disclosure.

In some embodiments, referring to FIG. 4 to FIG. 6, the damping assembly 3 includes a shaft 31, a first connecting member 32, a second connecting member 33, and at least one first washer 34. The first connecting member 32, the second connecting member 33, and the first washer 34 are all located between two ends of the shaft 31. The first connecting member 32 is rotatably sleeved on the shaft 31. The second connecting member 33 and the first washer 34 are sleeved on the shaft 31. The at least one first washer 34 is located between the first connecting member 32 and the second connecting member 33. The first connecting member 32 is fixedly connected to the wrench 2, and the second connecting member 33 is fixedly connected to the plate body 1.

The first connecting member 32, the second connecting member 33, and the first washer 34 are all located between the two ends of the shaft 31. One end of the shaft 31 is provided with a circular limiting portion, with the first connecting member 32, the first washer 34, and the second connecting member 33 sequentially abutting on a side of the limiting portion. The other end of the shaft 31 is connected with a nut, or the other end of the shaft 31 is enlarged to limit the first connecting member 32, the first washer 34, and the second connecting member 33. During assembly, the first connecting member 32, the first washer 34, and the second connecting member 33 are sequentially passed through the shaft 31 and abutted on the side of the limiting portion. Then, the other end of the shaft 31 is fitted with the nut, or is hammered or stamped for riveting. The first washer 34 can be a circular thin sheet, the first connecting member 32 can be fixed and connected to the wrench 2 through a screw, and the second connecting member 33 can be fixed and connected to the plate body 1 through another screw. The shaft 31 is exposed on an out side of the wrench 2, or one end of the shaft 31 is rotatably accommodated inside or at one end of the wrench 2. After assembly, in case the wrench 2 is rotated, the wrench 2 drives the first connecting member 32 to rotate around the shaft 31, while the shaft 31, the second connecting member 33, and the plate body 1 remain relatively stationary. This allows the wrench 2 to be opened to a preset position, then users can open the plate benefit by the battery avoiding port 11, so as to place the battery into the battery compartment 201 or remove the battery from the battery compartment 201. Then the plate is closed, and the wrench 2 returns to its original position. The preset position is defined as a position in which the wrench 2 opens to form the gap in the battery avoiding port 11 to allow the plate to be fully opened. An opening angle of the wrench 2 can be set according to the need of the size of the gap in the battery avoiding port 11. A head of the wrench 2 is accommodated in a limiting groove of the plate body 1, and in case the wrench 2 abuts a side wall of an opening of the limiting groove, the wrench 2 is prevented from continuing to rotate; in case the wrench 2 abuts another side wall of the opening of the limiting groove, the wrench 2 is prevented from continuing to rotate. Therefore, a range of the opening angle of the wrench 2 is cooperatively controlled by the two side walls of the limiting groove and two sides of the wrench 2.

In some embodiments, referring to FIG. 4 and FIG. 5, the damping assembly 3 further includes at least one elastic member 35 sleeved on the shaft 31. The elastic member 35 is located on a side of the first connecting member 32 away from the second connecting member 33, or on a side of the second connecting member 33 away from the first connecting member 32, allowing the first connecting member 32, the second connecting member 33, and the first washer 34 on the shaft 31 to provide a continuous bearing along an axial direction of the shaft 31. In order to facilitate the operation of the wrench 2 or improve users experience, the elastic member 35 is a spring or a bowl-shaped washer. The spring and the bowl-shaped washer may undergo deformation along the axial direction of the shaft 31 to accommodate compressing or releasing. The number of the elastic member 35 can be one, two, or more. The more the number of the elastic member 35, the smaller the compression force each elastic member 35 bears, and the longer the service life. A side of the bowl-shaped washer is defined with a curved groove, and another side is a curved shape. The spring may be a compression spring.

In some embodiments, referring to FIG. 4 and FIG. 5, the damping assembly 3 further includes a second washer 36. The second washer 36 includes a first surface 361 abutted the elastic member 35 and a second surface 362 abutted a side of the first connecting member 32. The second surface 362 is provided with at least one limiting protrusion 37 and the first connecting member 32 is correspondingly defined with at least one slot 38. Each limiting protrusion 37 is capable of sliding into or out of a respective slot 38. Or, the second surface 362 is defined with at least one slot 38 and the first connecting member 32 is correspondingly provided with at least one limiting protrusion 37.

The first connecting member 32 and the second washer 36 rotate in coordination with each other by means of the slot 38 and the limiting protrusion 37. In case the wrench 2 is closed on the side wall of the battery avoiding port 11, the limiting protrusions 37 of the second washer 36 are correspondingly accommodated in the slots 38 of the first connecting member 32. As the wrench 2 is gradually opened to form the gap in the battery avoiding port 11, the limiting protrusions 37 gradually slide out of the slots 38 and slide along the second surface 362 of the first connecting member 32, causing compression of the elastic member 35, thereby ensuring smooth sliding of the limiting protrusions 37. As the wrench 2 retract, the limiting protrusions 37 slide back along an original path on the second surface 362 of the first connecting member 32. When the limiting protrusion 37 slides into the slot 38, users may perceive, and the elastic member 35 is restored for preventing the wrench 2 from being easily opened. The number of the limiting protrusion 37 may be one, two, or more, and the limiting protrusions 37 may be arranged at equal intervals. A distance between adjacent limiting protrusion 37 can be equal. The limiting protrusion 37 can be trapezoidal, circular, and etc.

In some embodiments, the second surface 362 of the second washer 36 abuts a side of the second connecting member 33. The second surface 362 is provided with at least one limiting protrusion 37 and the second connecting member 33 is correspondingly defined with at least one slot 38. Or, the second surface 362 is defined with at least one slot 38 and the second connecting member 33 is correspondingly provided with at least one limiting protrusion 37.

In some embodiments, referring to FIG. 4 and FIG. 5, at least one side of the limiting protrusion 37 is provided with a first guiding slope 371, and at least one inner side wall of the slot 38 is correspondingly provided with a second guiding slope 381. The first guiding slope 371 abuts the second guiding slope 381.

As the wrench 2 is gradually opened to from the gap in the battery avoiding port 11, the limiting protrusions 37 gradually slide out of the slots 38 along the second guiding slope 381 of the slots 38, without getting stuck or experiencing any roughness. The limiting protrusions 37 then continue to slide along the second surface 362 of the first connecting member 32, causing the elastic member 35 to deform and shorten due to compression, ensuring smooth sliding of the limiting protrusions 37. As the wrench 2 retract, the limiting protrusions 37 slide back along the original path on the second surface 362 of the first connecting member 32. When the limiting protrusion 37 slides into the slot 38, the second guiding slope 381 of the slot 38 gradually guides the limiting protrusion 37 into the slot 38, providing the limiting protrusion 37 an instant acceleration of the sliding speed, allowing the limiting protrusion 37 to quickly slide into the slot 38, which provides users a perceiving and prevents the wrench 2 from being easily opened. The limiting protrusion 37 is provided with two first guiding slopes 371 matching the shape of the slot 38, to limit the movement of the wrench 2 and thus prevents the wrench 2 from shaking.

In some embodiments, referring to FIG. 4 and FIG. 5, the limiting protrusion 37 includes two opposite sides with each being provided with the first guiding slope 371. In case the limiting protrusion 37 is arranged on the second surface 362, a distance between the two first guiding slopes 371 gradually decreases in a direction away from the second surface 362; in case the limiting protrusion 37 is arranged on the first connecting member 32 or the second connecting member 33, the distance between the two first guiding slopes 371 gradually increases in the direction away from the second surface 362. The slot 38 includes two opposite sides with each being provided with the second guiding slopes 381, and a distance between the two second guiding slopes 381 gradually increases in a direction away from a bottom wall of the slot 38. In some embodiments, a top surface between the two first guiding slopes 371 of the limiting protrusion 37 can be V-shaped, and a bottom surface between the two second guiding slopes 381 of the slot 38 can be V-shaped.

In some embodiments, referring to FIG. 4 to FIG. 6, the elastic member 35 and the second washer 36 are located on one side of the first connecting member 32. The wrench 2 is defined with an accommodating groove 21 to accommodate the first connecting member 32. A bottom wall of the accommodating groove 21 is defined with a groove to accommodate an end of the shaft 31, the elastic member 35, and the second washer 36.

The end of the shaft 31 with the limiting portion can be rotatably accommodated in the accommodating groove 21, and the second washer 36 and the elastic member 35 that are located on one side of the first connecting member 32 are both accommodated in the accommodating groove 21, making the overall appearance of the camera base plate 100 neat and the structure compact.

In some embodiments, the elastic member 35 and the second washer 36 are located on one side of the second connecting member 33. The wrench 2 is defined with the accommodating groove 21 to accommodate the first connecting member 32. The plate body 1 is defined with a groove to accommodate the end of the shaft 31, the elastic member 35, and the second washer 36.

In some embodiments, referring to FIG. 4 and FIG. 5, both the second connecting member 33 and the first washer 34 are defined with a waist-shaped hole 39 respectively. The shaft 31 includes two opposite outer side walls with each defining an inclined surface, and the shaft 31 passes through the waist-shaped holes 39 of the second connecting member 33 and the first washer 34.

In order to prevent the second connecting member 33 and the first washer 34 from rotating relative to the shaft 31, the second connecting member 33 and the first washer 34 can be locked onto the shaft 31 by way of the waist-shaped hole 39. A cross-section of the shaft 31 is a waist shape. After the second connecting member 33 being sleeved on the shaft 31, the inclined surface of the outer side walls of the shaft 31 abuts an inner wall of the waist-shaped hole 39.

In some embodiments, the camera base plate 100 further includes a locking member 4 for connecting with the camera 200. The locking member 4 can be a screw. A bottom surface of an end of the plate body 1 away from the battery avoiding port 11 is defined with a cold shoe groove 12. The cold shoe groove 12 is configured for installing a camera light or microphone. Two sides of the plate body 1 are provided with a slider 13 respectively. The slider 13 can be a dovetail slider, which is configured to be connected with a dovetail groove. The plate body 1 is defined with a plurality of threaded holes 14, which are configured to be connected with other accessories.

The above description is only a part or preferred embodiments of the present disclosure. Whether in words or in the drawings, it should not limit the scope of protection of the present disclosure. Any equivalent structural changes made by utilizing the contents of the present disclosure specification and drawings or directly/indirectly applying them in other relevant technical fields, under the overall concept of the present disclosure, are included in the scope of protection of the present disclosure.

What is claimed is:

1. A camera base plate, comprising a plate body and a wrench, the plate body being defined with a battery avoiding port corresponding to an opening of a battery compartment of a camera, the battery avoiding port extending along a thickness direction of the plate body; the wrench being rotatably connected to the plate body through a damping assembly, and the wrench defining a part of a side wall of the battery avoiding port;

wherein the damping assembly comprises a shaft, a first connecting member, a second connecting member, and at least one first washer; the first connecting member, the second connecting member, and the first washer are all located between two ends of the shaft; the first connecting member is rotatably sleeved on the shaft, the second connecting member and the first washer are sleeved on the shaft, the at least one first washer is located between the first connecting member and the second connecting member, the first connecting member is fixedly connected to the wrench, and the second connecting member is fixedly connected to the plate body.

2. The camera base plate of claim 1, wherein the damping assembly further comprises at least one elastic member sleeved on the shaft, and the elastic member is located on a side of the first connecting member away from the second connecting member, or on a side of the second connecting member away from the first connecting member.

3. The camera base plate of claim 2, wherein the elastic member is a spring or a bowl-shaped washer.

4. The camera base plate of claim 2, wherein the damping assembly further comprises a second washer, the second washer comprises a first surface abutted the elastic member and a second surface abutted a side of the first connecting member; the second surface is provided with at least one limiting protrusion and the first connecting member is correspondingly defined with at least one slot, or, the second surface is defined with at least one slot and the first connecting member is correspondingly provided with at least one limiting protrusion, and each limiting protrusion is capable of sliding into or out of a respective slot; or, the second surface of the second washer abuts a side of the second connecting member; the second surface is provided with at least one limiting protrusion and the second connecting member is correspondingly defined with at least one slot, or, the second surface is defined with at least one slot and the second connecting member is correspondingly provided with at least one limiting protrusion.

5. The camera base plate of claim 4, wherein at least one side of the limiting protrusion is provided with a first guiding slope, at least one inner side wall of the slot is correspondingly provided with a second guiding slope, and the first guiding slope abuts the second guiding slope.

6. The camera base plate of claim 5, wherein the limiting protrusion comprises two opposite sides with each being provided with the first guiding slope, when the limiting protrusion is arranged on the second surface, a distance between the two first guiding slopes gradually decreases in a direction away from the second surface; when the limiting protrusion is arranged on the first connecting member or the second connecting member, the distance between the two first guiding slopes gradually increases in the direction away from the second surface; the slot comprises two opposite sides with each being provided with the second guiding slopes, and a distance between the two second guiding slopes gradually increases in a direction away from a bottom wall of the slot.

7. The camera base plate of claim 4, wherein the wrench is defined with a accommodating groove to accommodate the first connecting member, and/or, a bottom wall of the accommodating groove is defined with a groove to accommodate an end of the shaft, the elastic member, and the second washer.

8. The camera base plate of claim 1, wherein both the second connecting member and the first washer are defined with a waist-shaped hole respectively, the shaft comprises two opposite outer side walls with each defining an inclined surface, and the shaft passes through the waist-shaped holes of the second connecting member and the first washer.

9. The camera base plate of claim 1, wherein the camera base plate further comprises a side plate and/or a top plate; and/or, the camera base plate further comprises a locking member for connecting with the camera; and/or, a bottom surface of an end of the plate body away from the battery avoiding port is defined with a cold shoe groove; and/or, two sides of the plate body are provided with a slider respectively; and/or, the plate body is defined with a plurality of threaded holes.

* * * * *